Dec. 18, 1956 T. H. BONN 2,774,956

MAGNETIC GATING CIRCUIT FOR CONTROLLING A PLURALITY OF LOADS

Filed Feb. 28, 1955 4 Sheets-Sheet 1

INVENTOR

THEODORE H. BONN

BY Charles C. English

AGENT

INVENTOR
THEODORE H. BONN
BY Charles E. English
AGENT

INVENTOR

THEODORE H. BONN

BY Charles C. English

AGENT

Dec. 18, 1956
T. H. BONN
MAGNETIC GATING CIRCUIT FOR CONTROLLING
A PLURALITY OF LOADS
2,774,956
Filed Feb. 28, 1955
4 Sheets-Sheet 4

INVENTOR
THEODORE H. BONN
BY Charles C. English
AGENT

United States Patent Office 2,774,956

Patented Dec. 18, 1956

2,774,956

MAGNETIC GATING CIRCUIT FOR CONTROLLING A PLURALITY OF LOADS

Theodore H. Bonn, Philadelphia, Pa., assignor, by mesne assignments, to Sperry Rand Corporation, New York, N. Y., a corporation of Delaware Application February 28, 1955, Serial No. 490,850

23 Claims. (Cl. 340—174)

This invention relates to magnetic gating circuits for controlling a plurality of loads. The invention is peculiarly adapted for use in computing or data translating systems.

Heretofore gating and control circuits have employed diodes as the main circuit components thereof, but diodes are likely to fail. It is an object of this invention to reduce the number of diodes required in circuits of the type here involved and to replace some of the diodes with more reliable control devices.

In the prior art it has been customary to employ vacuum tubes and diodes as the principal circuit elements in computing or data translating systems. Later developments have resulted in the use of magnetic amplifiers of the general type shown in Figure 1 of the drawings in combination with rectifier gating structures as the principal circuit elements in computing or data translating systems. The present application provides a magnetic gating system that may have some utility in connection with computing or data translating systems which utilize a large number of magnetic amplifiers of the general type shown in Figure 1 hereinbelow for computing purposes; however, the purpose for which the present invention was made is in connection with a new and radically different type of computing or data translating circuit in which a large number of magnetic gates are interconnected in such a way as to perform the computing or data translating function. It is the principal object of this invention to provide a magnetic gating circuit which has peculiar utility in this new overall computing system and which is especially adapted to cooperate with other magnetic gating circuits.

Another object of this invention is to provide a magnetic gating circuit adapted for use in a computing or data translating system in which the primary circuit elements are generally of the types shown in my several magnetic gating applications, hereinbelow specified.

Still another object of this invention is to provide a magnetic gating circuit which may cooperate with other magnetic gating circuits in forming a complete computing or data translating system.

Another object of the invention is to provide a magnetic gating system that is low in cost.

An additional object of the invention is to provide a magnetic gating circuit for controlling a plurality of loads.

Any of the hereinbelow described circuits may act as a magnetic gate or a magnetic buffer depending on its use in the computer or data translating circuit. Consequently, to avoid repetition, the devices will hereinafter be referred to as magnetic gates, using this term generically to include both magnetic gates and magnetic buffers. A gate is usually defined as a device wherein there is a signal output at the load only when there are predetermined inputs at all of the signal sources of the device. For example, if all of the signal sources had signals thereon occurring concurrently and if this produced an output at the load, the device would be acting as a gate. The device would be acting as a buffer if an input signal (or the lack of a signal) appears at one of the outputs in complemented or non-complemented form without appearing at any other signal input. By suitable connections to the circuit, the devices hereinafter described may act as either a gate or a buffer, and to avoid complexity of the descriptions, will be referred to as a gating system irrespective of whether they are acting as a gate or a buffer.

The invention employs a plurality of magnetic amplifiers interconnected with each other, as well as interconnected with a source of pulses and two or more loads. The interconnections are such that changes in impedance of the power windings of the magnetic amplifiers control the flow of currents to the loads. A number of arrangements are hereinafter described and claimed.

Figure 2:
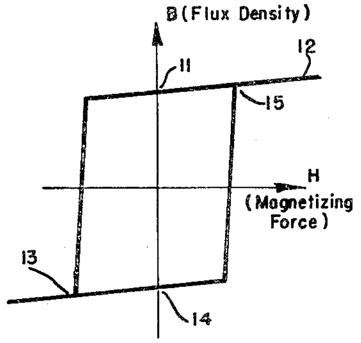
Figure 2 is an idealized hysteresis loop applicable to the core materials used throughout this application.

In all forms of the magnetic amplifiers hereinafter shown, the magnetic core may be made of a variety of materials among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

In order to furnish background information useful in connection with understanding the invention, a brief description of one type of magnetic amplifier will now be given. For further details on this and other types of magnetic amplifiers, reference is made to the following two applications: Theodore H. Bonn and Robert D. Torrey, Serial No. 402,858, filed January 8, 1954, entitled "Signal Translating Device"; John Presper Eckert, Jr., and Theodore H. Bonn, Serial No. 382,180, filed September 24, 1953, entitled "Signal Translating Device." These applications have been assigned to the same assignee as the present application.

Figure 1:
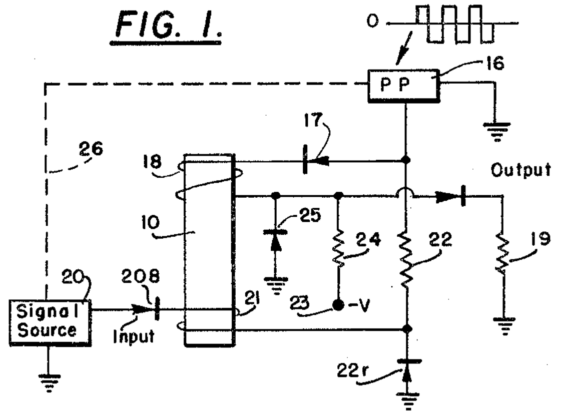
Figure 1 is a schematic diagram of a complementing magnetic amplifier of previously known type and which is described primarily for the purpose of supplying background information.

Figure 1 illustrates a complementing magnetic amplifier which is described to provide background information. In that figure, the source 16 of power pulses PP generates a train of equally spaced square wave positive and negative going pulses having spaces therebetween substantially equal to the duration of the pulses. If it be assumed that at the beginning of any given positive going pulse the core has residual magnetism and flux density as represented by point 11 of the hysteresis loop of Figure 2, the next positive power pulse will drive the core from point 11 to point 12, which represents saturation. At the conclusion of the positive going power pulse the magnetizing force will return to point 11. Successive pulses from power source 16 will flow through rectifier 17, coil 18 and load 19, repeatedly driving the core from point 11 to point 12. During the interval in which the core is being driven from 11 to 12, the core is operating on a relatively saturated portion thereof, whereby the impedance of coil 18 is low. Hence, positive power pulses will flow from source 16 to load 19 without substantial impedance. If during the interval between the positive excursions of two of the power pulses, a pulse is produced at the input source 20, it may pass through coil 21, resistor 22, source 16, to ground. This will magnetize the core negatively driving it from point 11 to point 13. At the conclusion of this negative pulse the core will return to point 14 where the magnetizing force is zero. The next positive power pulse from source 16 is just sufficient to drive the core from point 14 to point 15. Since this is a relatively unsaturated portion of the core, the coil 18 will have high impedance during this pulse and the current flow will be very low. At the conclusion of that positive pulse the magnetization will return to zero value 11. If no signal appears on the input immediately following the last-named positive power pulse, the next positive power pulse will drive the core to saturation at point 12 and will give a large output at the load 19.

Consequently, it is clear that the magnetic amplifier of Figure 1 will feed large positive pulses to the load in response to each positive pulse from source 16, except that immediately after the receipt of any pulse from the input 20 the next positive power pulse will be blocked.

In order to avoid appearance at the load 19 of the small so-called "sneak" current which flows during the period that a positive power pulse is driving the core from point 14 to point 15, the negative source 23, resistor 24 and rectifier 25 may be employed. Sufficient current flows through rectifier 25, resistor 24 and source 23 that the small "sneak" current from coil 18 to output 19 is cancelled.

Figure 3:
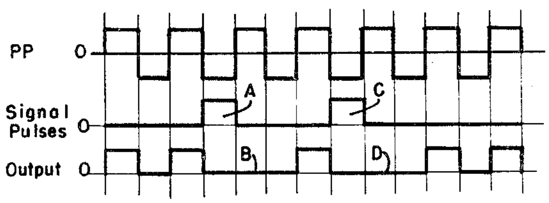
Figure 3 is a timing diagram for the device of Figure 1.

In one form of the device, coil 18 has twice the number of turns as coil 21 and the source 16 has twice the electrical potential as the pulses on input 20. The source 16 of positive power pulses, and the signal source 20 are so synchronized by any suitable means 26, that the signal pulses always occur during the spaces between positive power pulses. As shown in Figure 3, the signal pulses A and C, as do all other signal pulses, occur at times when the positive power pulses PP are at negative values. It follows from the foregoing description of Figure 1 that there will be a continuous train of power pulses in the output except during those intervals B and D which immediately follow the signal pulses A and C.

In some of the magnetic amplifiers hereinafter described, the means 23, 24 and 25 for suppressing the "sneak" currents has been omitted from the drawings and description, but could be added if desired.

The output of source 16 is an alternating current and goes negative during the space between positive power pulses. The negative pulse more than cancels any potential induced in coil 18 due to signal currents flowing through primary 21. As a result the negative excursions of source 16 render the anode of rectifier 17 negative and cut off that rectifier.

The device of Figure 1, just described, per se is not part of the invention. It has been described primarily as back-ground information and secondarily since the circuit of Figure 1 is incorporated as a component part of some of the more complex circuits hereinafter described. The device of Figure 4, now to be described embodies a basic and important concept and constitutes one form of the invention.

Figure 4:
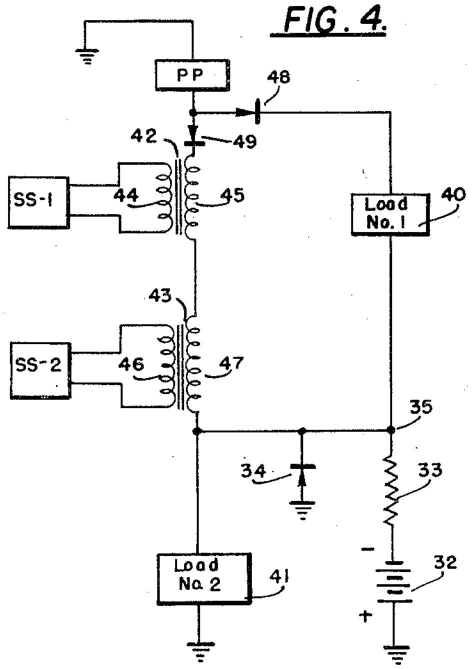
Figure 4 is a block diagram showing one form of the invention.

In Figure 4 the device employs a source of square wave power pulses having a waveform the same as for source PP of Figure 1, and two loads 40 and 41. There are two magnetic amplifiers having cores 42 and 43 respectively. Core 42 has a control or signal winding 44 and a power winding 45; while core 43 has a control or signal winding 46 and a power winding 47. The two signal windings are controlled by signal sources SS–1 and SS–2 respectively. Rectifier 48 is in series with load 40 and rectifier 49 is in series with windings 45 and 47.

Battery 32, resistor 33 and rectifier 34 cooperate with load 40 to prevent current flow in load 41 when the latter should be de-energized, as hereinafter described.

For the purposes of this specification, the core 42 together with the coils 44 and 45 is considered a magnetic amplifier. Assuming that no signals appear at signal sources SS–1 and SS–2, the input coils 44 and 45 will not be energized. Since the load 40 has high impedance, the positive going excursions (hereinafter called the power pulses) of source PP will flow through rectifier 49, coil 45, coil 47, to load 41 and energize the latter. Successive pulses from source PP will drive the cores 42 and 43 to saturation so that substantially all of the current flows through the coils 45 and 47. These coils then constitute a low impedance virtual short circuit across load 40 and deliver practically all of the current from source PP to load 41. Hence, practically no potential will be developed across load 40.

In event one of the signal sources, for example SS–1, should furnish a signal during the spaces between two of the power pulses of source PP, and revert the core 42, the next power pulse from source PP will find high impedance in coil 45 and therefore the source PP will apply substantially its entire potential across rectifier 48 and load 40. In this case load 40 will be energized. Load 41 will not be energized, however, since coil 45 has high impedance and prevents flow of substantial current from source PP to load 41 through coil 45. The elements 32, 33 and 34 may be designed to prevent the current flowing through load 40, when it is energized, from also flowing through load 41. This feature of the combination will now be explained. When there is no current from source PP, battery 32 and resistor 33 supply a current through rectifier 34 which is equal to the current which flows through load 40 when it is energized. In other words, when either of coils 45 or 47 has high impedance the load 40 is energized and a certain current I flows therethrough. This same strength of current I will flow in the circuit 32—33—34 during the periods when source PP is going negative. It follows from the foregoing that whenever either of the coils 45 or 47 has high impedance substantially all of the current from source PP will flow through rectifier 48, load 40, resistor 33, battery 32, to ground, and the wire 35 will be at substantially ground potential. The reason why point 35 is at ground potential is that the potential drop across resistor 33 is equal to the potential of battery 32 and the potential drop across the load 40 is equal to the potential of source PP. Consequently, load 40 is energized and load 41 is de-energized.

In view of the above description, it is clear that as long as neither of sources SS–1 nor SS–2 reverts its respective core 42 or 43 during the spaces between power pulses of source P, the coils 45 and 47 will have low impedance and load 41 will be energized. In event either of sources SS–1 or SS–2 is energized during a space between pulses of source PP and reverts its respective core, its complementary core 45 or 47, as the case may be, will have high impedance and substantially all of the current from source PP will flow through load 40.

Preferably, the load PP is of the constant potential type, that is it has good voltage regulation and its potential drops only slightly when there is a variation in the current drawn therefrom.

Figure 5:
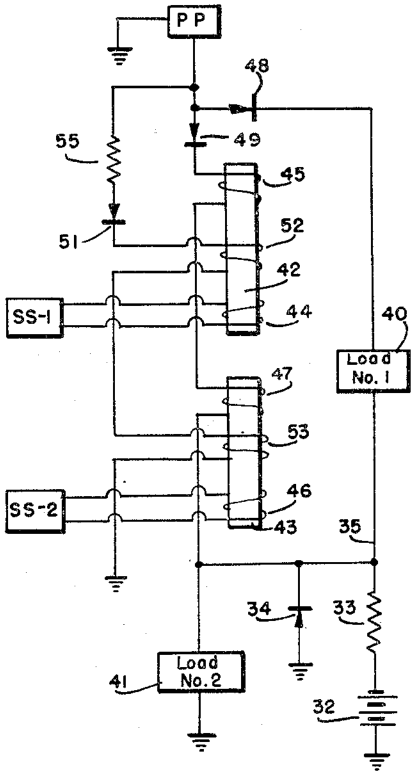
Figure 5 is a schematic diagram of the device of Figure 4 with certain improvements added.

There may occur in some cases, in connection with Figure 4, certain inaccuracies in the results for the following reason. Source PP has sufficient volt-seconds to drive either of cores 42 or 43 from point 14 to point 15 on its hysteresis loop (see Figure 2) in event the power winding of the other core has low impedance. In other words, assume that core 42 is at point 14 on the hysteresis loop and core 43 is at point 11 on the hysteresis loop at the beginning of a positive power pulse. That power pulse would be just sufficient to drive the core 42 from point 14 to point 15 on the hysteresis loop. In event both cores 42 and 43 were reverted by signal pulses so that both were at point 14 on the hysteresis loop, the next power pulse would be insufficient to drive both cores from point 14 to point 15 on the hysteresis loop and hence if during the next signal pulse time period which immediately follows the last mentioned power pulse, there is no signal at either of sources SS–1 or SS–2, the next power pulse from source PP will be unable to drive both cores to saturation and a discrepancy in the operation will thereby result. Figure 5 illustrates a modification of Figure 4 designed to overcome this difficulty.

Like parts in Figures 4 and 5 are represented by similar reference numbers. The only difference between these two figures is that a resistor 55, rectifier 51 and coils 52 and 53 have been added to Figure 5. The resistance of element 55 is so large that the current flowing therethrough is always substantially constant notwithstanding any variations in the impedances of coils 52 and 53. The current flowing through the coils 52 and 53, as determined by the resistor 55, is so related to the number of turns on the coils 52 and 53 that at the end of each power pulse of source PP, the cores 42 and 43 will always be at point 15 on the hysteresis loop.

In Figures 4 and 5, the source of power pulses PP has negative going excursions which render the anodes of rectifiers 48, 49 and 51 negative so that no currents may flow through these rectifiers during the interval between power pulses. This prevents any current from flowing in the coils 45, 47, 52 and 53 as a result of the induction of potential in those coils, when signal currents flow through the coils 44 and 46.

Figure 6:
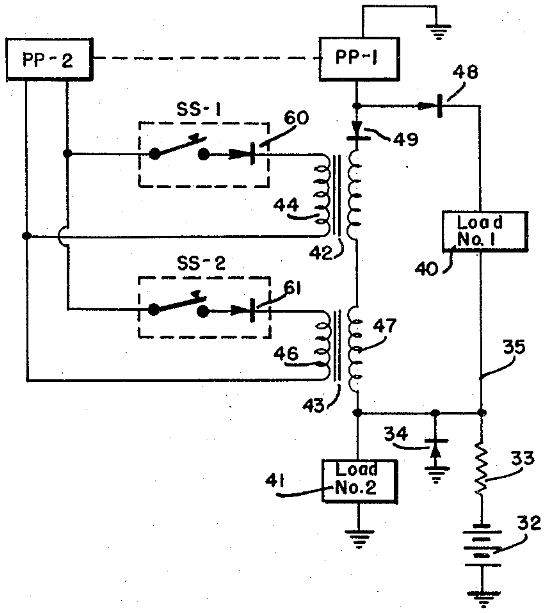
Figure 6 is another illustration of Figure 4 with certain improvements added.
Figure 6A:
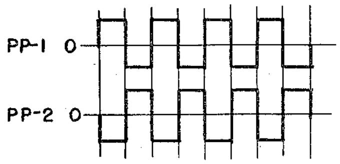
Figure 6A is a waveform diagram of the two sources of power pulses shown in Figure 6.

Figure 6 is a further modified form of Figure 4 in which like reference numbers represent like parts. This figure shows how one may obtain signals for the control windings 44 and 46. Here two sources of power pulses PP–1 and PP–2 are used which have waveforms as shown in Figure 6A. In other words, source PP–2 goes positive when source PP–1 is negative. Since the signal time period conforms with the negative excursions of source PP–1, it is clear that source PP–2 is producing positive pulses during the signal period of source PP–1. These positive pulses are fed to the signal sources SS–1 and SS–2 which in this case are simple switches in series with rectifiers such as 60 and 61. When either switch is closed, the positive excursions of source PP–2 will flow through the complementary rectifier and cause the complementary signal coil to thus control the appropriate magnetic amplifier.

Figure 7:
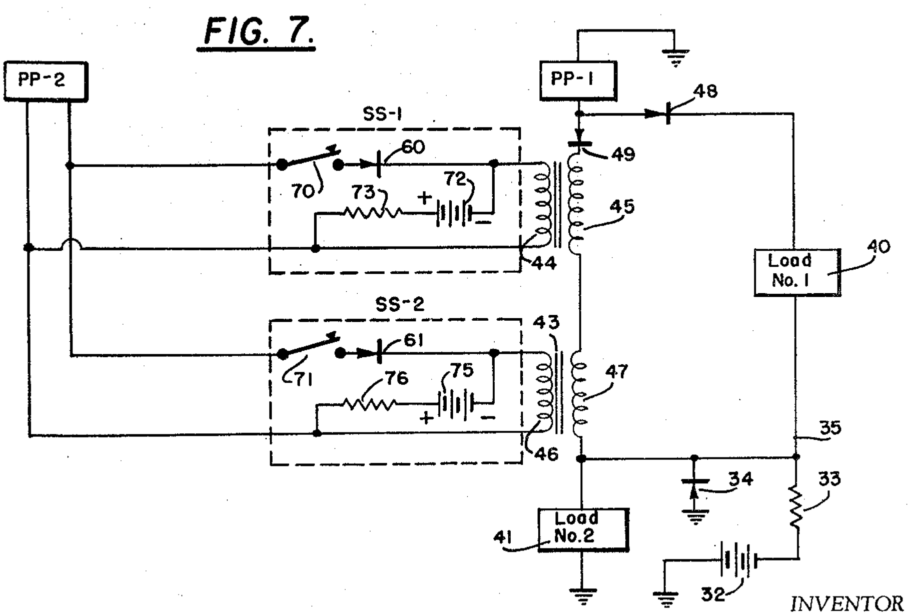
Figure 7 is a modified form of the device of Figure 4.

Figure 7 is a modified form of Figure 6. Sometimes it is desired that the signal windings 44 and 46 will be continuously energized during the spaces between power pulses and that the application of one or the other signal, here the closure of one or the other of the switches, in this case 70 or 71 as the case may be, will terminate the energization of its complementary signal winding. To effect this result, a battery 72 and a resistor 73 are placed across the signal input winding 44 and tend to supply a current which will revert the core (to point 13 on the hysteresis loop) in event switch 70 is open. Similarly, battery 75 and resistor 76 will pass a current through signal winding 46 tending to revert the core 43 (to point 13 on the hysteresis loop) while switch 71 is open. If switch 70 is closed, the potential of source PP–2 will cancel that of battery 72 and the coil 44 will not revert the core 42 during the signal time period. Switch 71 will have a similar effect on core 46. Hence, the device of Figure 7 operates in the same way as the device of Figure 6 except that closure of a switch of Figure 7 has the same effect as opening the complementary switch of Figure 6.

Figure 8:
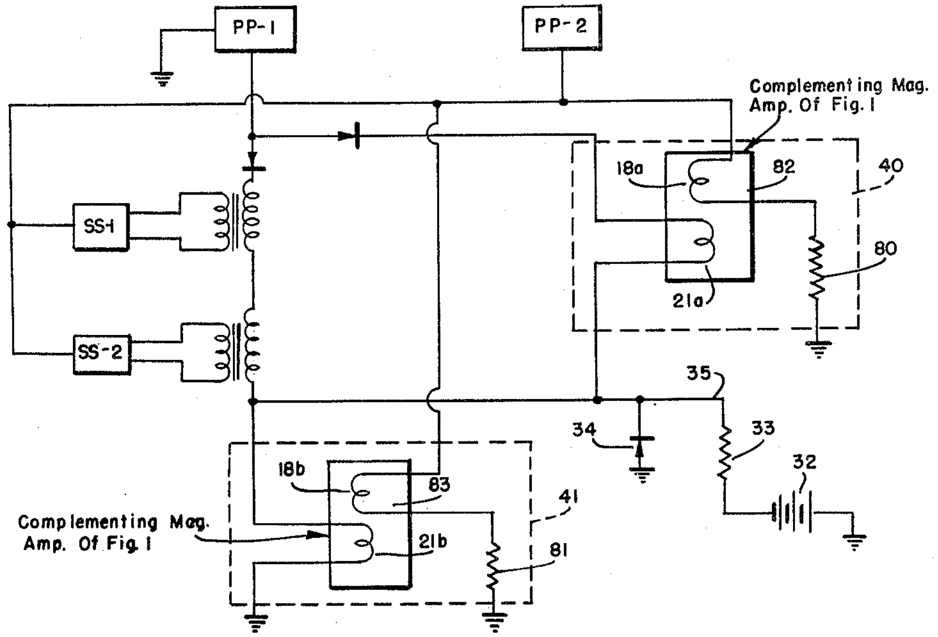
Figure 8 is a further modified form of the device of Figure 4.

Figure 8 is a further modified form of Figure 4 in which the reversal of operation occurs at the output rather than at the input. In the prior figures I have illustrated how the first load may be energized and de-energized under certain circumstances. In event it is desired that under these same circumstances the load be energized where under similar conditions and prior figures it was de-energized, and vice versa, a complementing magnetic amplifier of the type shown in Figure 1 may be included in the load. In this case, the two loads would be broadly referred to as load 40 and load 41. Load 40, however, includes a complementing magnetic amplifier of the type shown in Figure 1 and designated by reference number 82, the output of which controls the load element 80 which actually performs an operating function in the computer circuit. Similarly, the load 41 includes a complementing magnetic amplifier 83, the output of which controls the load element 81 which performs an operating function in the computing circuit. The coils 18$a$ and 18$b$ of the complementing magnetic amplifiers 82 and 83 correspond with coil 18 of Figure 1, and are energized by source PP–2 which may also energize the signal sources SS–1 and SS–2 the same as in connection with Figure 6 (or Figure 7). The input windings 21$a$ and 21$b$ of the complementing magnetic amplifiers 82 and 83 are connected in the same place that the loads 40 and 41 of Figure 4 were connected.

In Figure 8 whenever input winding 21$a$ is energized, the next power pulse from source PP–2 will not flow to the load element 80. However, in those cases where input winding 21$a$ is not energized, the next pulse from source PP–2 will flow to load 80. Hence, the outputs will be the reverse of those experienced in connection with Figure 6 for example. Similarly, when coil 21$b$ is not energized, the next pulse from source PP–2 will flow to load 81 and when coil 21$b$ is energized the next pulse from source PP–2 will not flow to the load element 81.

Figures 9, 10:
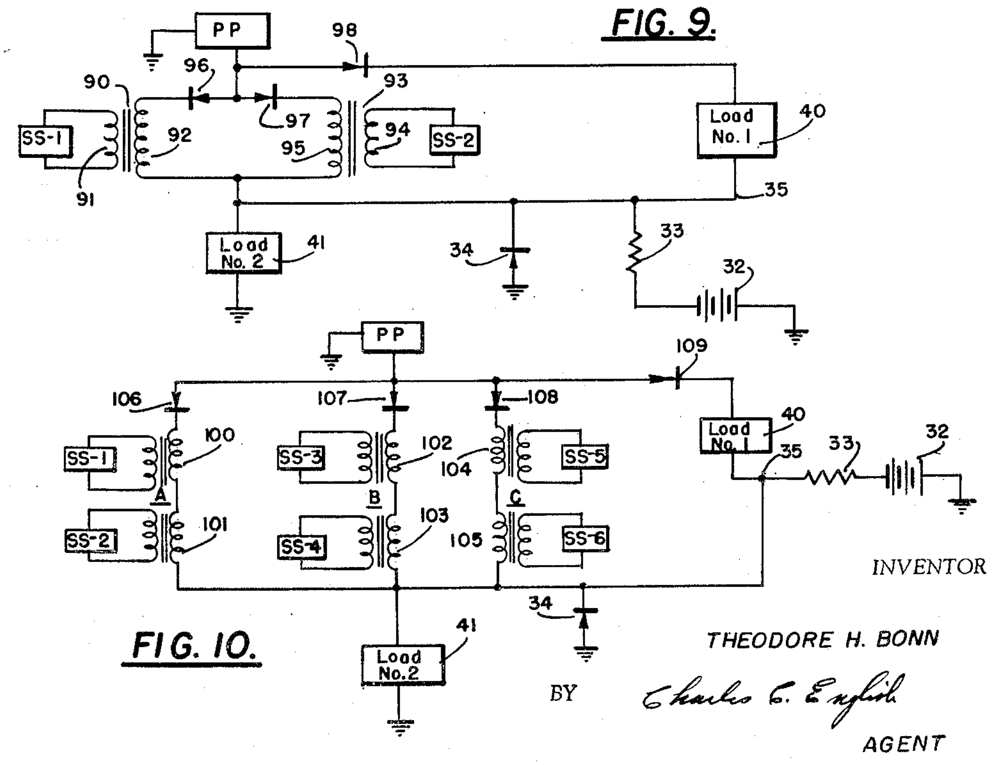
Figure 9 is a block diagram of a modified form of the invention.
Figure 10 is a block diagram of a further modified form of the invention.

Figure 9 is a modified form of Figure 4 in which similar parts bear similar reference numbers. However, the power windings of the two magnetic amplifiers are connected in parallel instead of in series. The core 90, composed of material hereinbefore specified, has input or signal winding 91 and power winding 92. Core 93 has input or signal winding 94 and power winding 95. Rectifiers 96 and 97 are respectively in series with the power windings 92 and 95. Rectifier 98 is in series with the load 40. If cores 90 and 93 are both reverted by their complementary signal sources SS–1 and SS–2 during the spaces between power pulses of source PP, the coils 92 and 95 will have high impedance and substantially all of the current will flow from source PP, through rectifier 98, load 40, to ground without passing through load 41. The battery 32, resistor 33 and rectifier 34 serve the function mentioned in connection with Figure 4 and hold point 35 at ground potential when the power windings 92 and 95 have high impedance.

If, however, either of the signal sources SS–1 or SS–2 does not revert its complementary core during a space between power pulses of source PP, the next pulse from source PP will find a low impedance path directly to load 41 and so all of the current will be shunted around load 40 and into load 41. For example, assume that signal source SS–1 does not revert core 90 during a space between pulses of source PP. The next pulse from source PP will find coil 92 with low impedance and substantially all of the current from source PP will flow through rectifier 96, coil 92 to load 41 and substantially no current will flow through load 41.

If desired, a series circuit such as 55, 51, 52 and 53 of Figure 5 may be added to Figure 9 with coils such as 52 and 53 on the cores 92 and 93 to serve the same function as is served in connection with Figure 5. The latter will insure that if a given core is not reverted during a space between power pulses that the next power pulse will drive it to saturation.

Figure 10 is a further modified form of the invention. Reference numbers common to Figure 10 and to earlier figures represent similar parts. In Figure 10 there are a plurality of magnetic amplifiers each having a power winding. The power windings 100 and 101 form a first branch of the circuit and are in series with each other. Similarly, power windings 102 and 103 form a second branch of the circuit and are in series with each other. Power windings 104 and 105 form a third branch of the parallel circuit and are in series with each other. Suitable rectifiers 106, 107, 108 and 109 are respectively in series with the four parallel branches. The source PP, as before, is an alternating current source and during its negative excursions it renders the anodes of rectifiers 106 through 109 negative and thereby prevents any flow of current by reason of potentials induced in the coils 100 to 105 due to any change in flux created by the signal sources SS–1 to SS–6 inclusive. Coils 100 and 101 taken together can be regarded as branch A of the circuit. Coils 102 and 103 taken together are referred to as branch B, and coils 104 and 105 taken together are referred to as branch C. In event any one of the three branches of the circuit has low impedance, all of the current from source PP will be shunted through that low impedance branch to load 41 and there will be substantially no flow of current in load 40. Any one of the branches will have high impedance if either of the coils in that branch has high impedance. If all of the branches have high impedance, then load 40 will be energized and load 41 will not. In connection with this figure, it is understood that it is not necessary that all of the branches have the same number of magnetic amplifiers. The apparatus could be modified by eliminating one of the magnetic amplifiers in one of the branches and including one or more magnetic amplifiers in one or more of the other branches. Moreover, it is not necessary that each branch be composed of a single series of power windings, but in fact one or more branches could include series-parallel arrangements of power windings. For example, branch C could have an additional magnetic amplifier with its power winding in parallel with the power winding 104 so that there would be a parallel path across power winding 104 and that parallel path would be in series with power winding 105. The principles just explained can be expanded indefinitely to secure any effect desired.

While Figures 9 and 10 have not illustrated all of the variations which were shown in connection with Figure 4, it is understood that they may be applied to Figures 9 and 10 the same as to Figure 4. In other words, Figure 5 teaches the addition of a coil such as 52 on each core to set the core during the power pulse period and insure that it always is at point 11 on the hysteresis loop at the end of the power pulse. This may be applied to Figures 9 and 10 by placing such a coil on each core. Figure 6 teaches that a second source of power pulses may be controlled in order to form the signal pulses. This expedient can of course be applied to Figures 9 and 10. Figure 7 shows a modified version of Figure 6 wherein batteries normally revert the core and the second source of power pulses is controlled to neutralize the effect of the batteries and thus reverse the operation of the control switches. This expedient may of course be applied to Figures 9 and 10. Figure 8 illustrates that complementing magnetic amplifiers may be included in the loads so as to reverse the effect on the loads. These expedients may of course be adopted in connection with Figures 9 and 10. It follows that the expedients stressed in connection with Figures 5, 6, 7 and 8 may be combined with each other, hence any or all of these expedients may be added to the devices of Figures 9 and 10.

Figure 11:
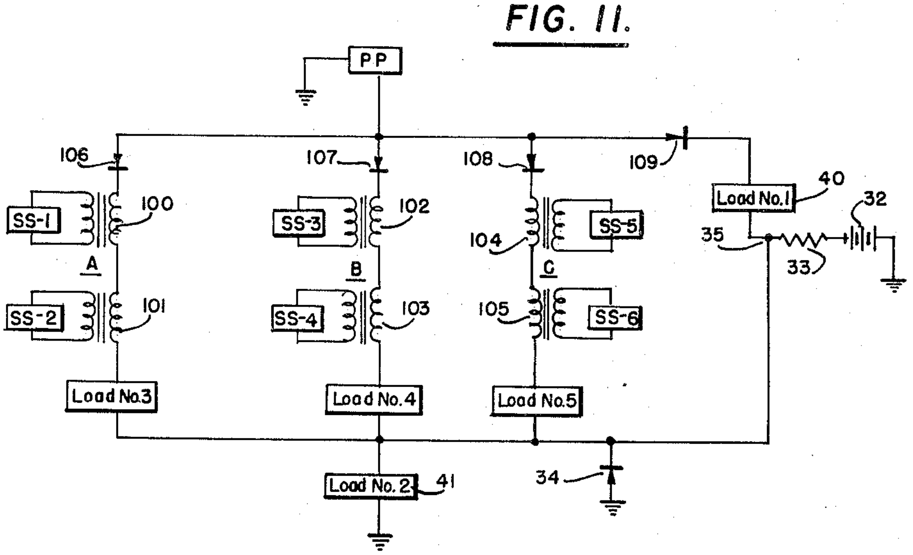
Figure 11 is a block diagram of a modified form of Figure 10.

Figure 11 is the same in construction and mode of operation as Figure 10 except that three additional loads entitled "Load No. 3," "Load No. 4" and "Load No. 5" have been placed in series with coils 101, 103 and 105. These loads will be energized whenever current flows through their complementary coils.

Figure 12:
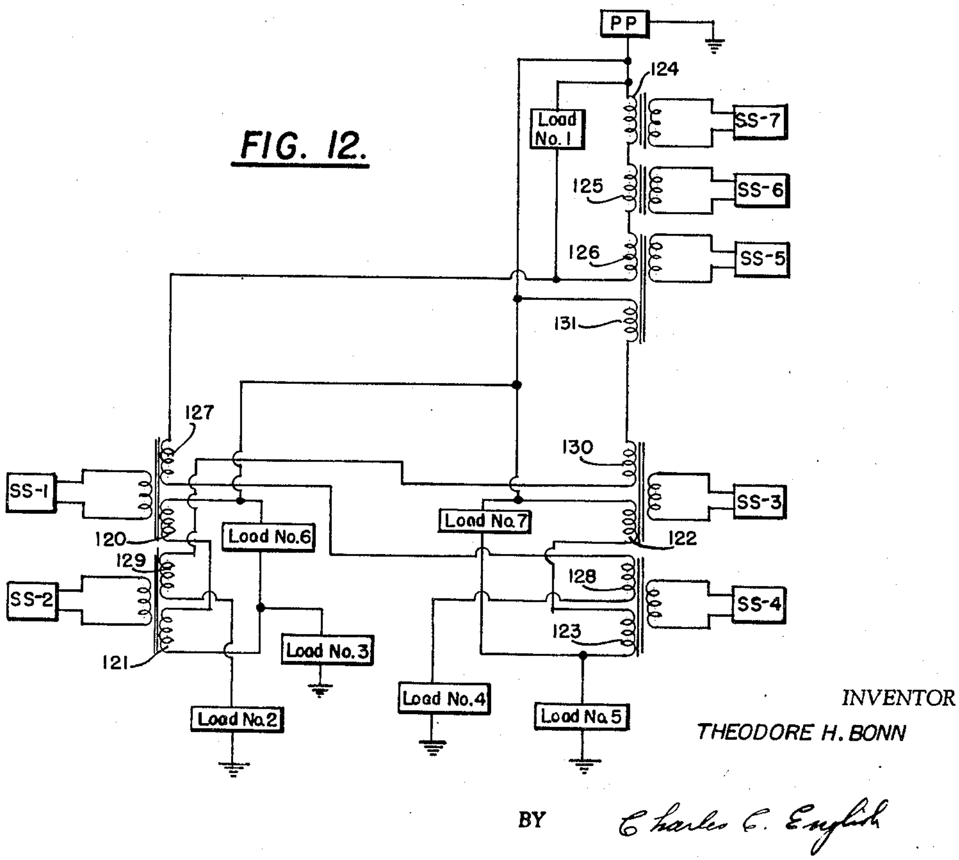
Figure 12 is a schematic diagram of a further modified form of the invention showing how a large number of gating circuits may be interconnected.

Figure 12 is a further modified form of the invention in which a number of units similar to those shown in Figure 4 have been interconnected in a novel way. For example, the sources SS–1, SS–2, together with windings 120 and 121, together with loads No. 3 and No. 6, would constitute a complete unit the same as shown in Figure 4. The signal sources SS–3 and SS–4, together with Load No. 5 and Load No. 7, together with coils 122 and 123, form another complete unit of the type shown in Figure 4. It is noted that each core may have a coil thereon which is in circuit with another unit. For example, units SS–5, SS–6 and SS–7 have complementary windings 124, 125 and 126. Load No. 1 is shunted across the series circuit including said three windings 124 to 126. Instead of the lower end of winding 126 connecting directly to Load No. 4, it passes through winding 127 which is controlled by signal source SS–1 and through winding 128 which is controlled by signal source SS–4, before reaching Load No. 4. In this situation it is clear that Load No. 4 is controlled in a peculiar way by signal sources SS–1, SS–4, SS–5, SS–6 and SS–7. Load No. 2 is controlled by winding 129 (controlled by signal source SS–2) as well as by winding 130 (which is controlled by signal source SS–3), as well as by winding 131 (which is controlled by signal source SS–5). All three windings 129, 130 and 131 must be in a low impedance condition, due to previous action of their complementary signal sources, before current may flow from source PP to Load No. 2.

The circuit of Figure 12 is merely illustrative of one complex circuit involving the simpler circuit of Figure 4. By appropriately combining secondary windings on the several cores, it is possible to have the currents at the loads indicate almost any combination of input signals to the device.

It is further understood in connection with Figure 12, as in connection with the other figures, that a setting coil similar to coils 52 and 53 of Figure 5 may be placed on each core and appropriately energized by each power pulse to make sure that the core is set to positive remanence at the end of each power pulse.

This application is a continuation-in-part of my following copending applications all assigned to the same assignee as the present application: Theodore H. Bonn, United States patent application Serial No. 461,968, filed October 13, 1954, entitled "Magnetic Gating Circuits"; Theodore H. Bonn, United States patent application Serial No. 465,695, filed October 29, 1954, entitled "Magnetic Gating Circuits"; and Theodore H. Bonn, United States patent application Serial No. 465,624, filed October 29, 1954, entitled "Magnetic Gating Circuits."

I claim to have invented:

1. In a system of magnetic gating, a source of spaced power pulses, a first load, a second load, means shunted across the first load and in series with both the second load and said source for controlling the flow of current from said source to said loads, the last-named means including at least two magnetic amplifiers each having a control winding and a power winding, said power windings being connected to the source and to said loads to determine flow of current to the latter, and a signal source for each control winding for energizing the control winding during the spaces between power pulses.

2. In a system of magnetic gating as defined in claim 1, said power windings all being in series with each other as well as in series with said source and the second load, the first load being shunted across a plurality of said power windings.

3. In a system of magnetic gating as defined in claim 2, the first load being shunted across the entire group of said power windings.

4. In a system of magnetic gating as defined in claim 1, said power windings being in parallel with each other as well as in parallel with the first load.

5. In a system of magnetic gating as defined in claim 1, said power windings forming a plurality of parallel branch circuits with more than one power winding in at least one of the branch circuits, the first load being in parallel with said group of parallel branch circuits.

6. In a system of magnetic gating as defined in claim 1, said power windings forming a plurality of parallel branch circuits with a plurality of power windings in all of the branch circuits, the first load being in parallel with said group of parallel branch circuits.

7. In a system of magnetic gating as defined in claim 1, a second source of spaced pulses which produces pulses during the spaces between pulses of the first source and feeding them to the signal sources, said signal sources controlling the flow of pulses from the second source to said control windings whereby the pulses fed to the control windings occur during the spaces between pulses of the first-named source.

8. In a system of magnetic gating as defined in claim 1, each signal source comprising means for normally supplying current to each control winding tending to revert its complementary core and control means for cancelling the effect of the last-named means during the spaces between power pulses.

9. In a system of magnetic gating as defined in claim 1, said first load comprising all of the following: a complementing magnetic amplifier having an input coil connected across said first-named means, said complementing magnetic amplifier having an output coil, and load element controlled by the output coil.

10. In a system of magnetic gating as defined in claim 1, said second load comprising all of the following: a complementing magnetic amplifier having an input coil connected in series with said first-named means, said complementing magnetic amplifier having an output coil, and a load element controlled by the output coil.

11. In a system of magnetic gating as defined in claim 1, means connected to the first load to shunt the current flowing through the first load around the second load so that when the first-named means has high impedance substantially no current will flow in the second load.

12. In a system of magnetic gating, a source of spaced power pulses, a first load, a second load, a plurality of magnetic amplifiers having power windings connected to the loads to control the flow of current from the source through the loads in different ways depending upon the impedances of the power windings, each magnetic amplifier having a core, and separate control means for each magnetic amplifier to control the reversion of the core thereof.

13. In a system of magnetic gating, a source of spaced power pulses, a first load, a second load, a group of magnetic amplifiers having power windings in series with each other, a series circuit including said source, said group of series-connected power windings and said second load, the first load being shunted across at least a part of said group, said magnetic amplifiers each having a core for controlling the impedance of its power winding, and control means associated with each core to control the reversion thereof during the spaces between power pulses.

14. In a system of magnetic gating as defined in claim 13, another group of series-connected power windings shunted across the first-named group, a core for each power winding of the second group, and separate control means for controlling the reversion of each core of the second group.

15. In a system of magnetic gating; a source of spaced power pulses; a first load; a second load; a group of magnetic amplifiers having power windings, said power windings being respectively included in a plurality of branch circuits which are in parallel with each other and with the first load; said source, the branch circuits and first load taken as a group, and the second load being in series with each other; each magnetic amplifier having a core for controlling the impedance of its power winding; and control means for each core for controlling the reversion thereof during the spaces between power pulses.

16. In a system of magnetic gating as defined in claim 15, a plurality of said branch circuits each having a plurality of power windings therein.

17. In a system of magnetic gating; a source of spaced power pulses; a first load; a second load; magnetic amplifier means shunted across the first load; a series circuit including the source, the magnetic amplifier means and the second load; control means for controlling the impedance that the magnetic amplifier means presents to pulses from said source; and means shunted across the second load for preventing flow of current therethrough when the magnetic amplifier means has high impedance.

18. In a system of magnetic gating; a source of spaced power pulses; a plurality of magnetic amplifiers each having a power winding, a core for controlling the impedance of the power winding and control means for controlling the region of the hysteresis loop on which the core operates in response to a power pulse; a first load; a second load; a series circuit including the source, at least some of the power windings and the second load; the first load being shunted across the group of power windings; a first rectifier in that part of said series circuit which is shunted by the second load; and a second rectifier in series with the first load and included in the shunting circuit.

19. In a system of magnetic gating; a source of spaced power pulses; a plurality of magnetic amplifiers each having a power winding, a core for controlling the impedance of the power winding, and control means for controlling the region in which the core operates in response to a power pulse; a first load; a second load; a plurality of at least three branch circuits in parallel with each other one of which includes the first load and the others of which each include at least one of said power windings; each branch circuit also including a rectifier; and a series circuit including the source, the branch circuits taken as a group and the second load.

20. In a system of magnetic gating; a source of spaced power pulses; a first load; a second load; magnetic amplifier means having a plurality of power windings connected to each other and means responsive to a plurality of input signals for respectively controlling the impedances of said power windings; a series circuit including said source, said magnetic amplifier means and said second load; the first load being shunted across the magnetic amplifier means; and means shunted across the second load for reducing the flow of current therethrough when the magnetic amplifier means has high impedance, the last-named means comprising a rectifier shunted across the second load and polarized in the opposite direction from the flow of current from said source through the second load, and a resistor and a source of potential shunted across said rectifier to pass current therethrough which is substantially equal to the current that would flow through the second load in the absence of the last-named means when the magnetic amplifier means has high impedance.

21. A system of magnetic gating as defined in claim 19 in which there is at least one load in each branch circuit.

22. In a system of magnetic gating, a plurality of loads, a source of spaced power pulses, a plurality of magnetic amplifiers at least some of which have plural power windings, separate control means for each magnetic amplifier to control the reversion of the core thereof and means connecting a plurality of said windings in series with each other and shunted across one load and in series with another load, and means connecting another group of said power windings in series with each other and shunted across yet another load as well as in series with still another load.

23. A system of magnetic gating as defined in claim 22 in which some of the cores which have plural windings thereon have such windings connected in separate circuits.

References Cited in the file of this patent

UNITED STATES PATENTS

| | | |
|---|---|---|
| 2,719,961 | Karnaugh | Oct. 4, 1955 |
| 2,730,632 | Curtis | Jan. 10, 1956 |